(12) United States Patent
Fu et al.

(10) Patent No.: US 9,145,972 B2
(45) Date of Patent: Sep. 29, 2015

(54) COUPLING STRUCTURE

(75) Inventors: Zhi Ping Fu, Shenzhen (CN); Min Li, Shenzhen (CN)

(73) Assignee: Johnson Electric S.A., Murten (CH)

( * ) Notice: Subject to any disclaimer, the term of this patent is extended or adjusted under 35 U.S.C. 154(b) by 628 days.

(21) Appl. No.: 13/231,696

(22) Filed: Sep. 13, 2011

(65) Prior Publication Data

US 2012/0063903 A1   Mar. 15, 2012

(30) Foreign Application Priority Data

Sep. 14, 2010   (CN) .................. 2010 2 0530229 U

(51) Int. Cl.
*F01D 25/00* (2006.01)
*F04D 29/054* (2006.01)
*F04D 29/12* (2006.01)
*F16J 15/34* (2006.01)
*F04D 29/20* (2006.01)

(52) U.S. Cl.
CPC ............ *F16J 15/3464* (2013.01); *F04D 29/20* (2013.01)

(58) Field of Classification Search
CPC . A47L 15/4225; A47L 15/4227; F04D 29/20; F04D 29/054; F16J 15/3464

USPC ......................................................... 415/231
See application file for complete search history.

(56) References Cited

U.S. PATENT DOCUMENTS

| | | | | |
|---|---|---|---|---|
| 3,370,598 A * | 2/1968 | Lopp et al. | .................... | 134/111 |
| 3,918,479 A * | 11/1975 | Perl | ............................... | 137/340 |
| 5,482,432 A * | 1/1996 | Paliwoda et al. | .......... | 415/168.2 |
| 6,364,605 B1 * | 4/2002 | Lutes | ............................. | 415/111 |
| 6,454,872 B1 * | 9/2002 | Miller et al. | .................... | 134/10 |
| 8,241,434 B2 * | 8/2012 | Walkden | ..................... | 134/56 D |
| 2003/0153218 A1* | 8/2003 | Booe | ........................... | 440/53 |
| 2004/0191062 A1* | 9/2004 | Dahlheimer | ................. | 415/231 |

* cited by examiner

*Primary Examiner* — Dwayne J White
*Assistant Examiner* — Brian O Peters
(74) *Attorney, Agent, or Firm* — Muncy, Geissler, Olds & Lowe, P.C.

(57) ABSTRACT

A coupling structure for connecting an impeller to a motor shaft of a liquid pump, includes a carrier rod sleeved on the shaft, and a seal assembly connecting the carrier rod to a housing of the pump. The carrier rod is fixed to the shaft by way of a screw thread structure. The seal assembly includes a rotating seal sealingly fixed on an outer surface of the carrier rod and fixed to the carrier rod for rotation there with by an interlocking structure.

10 Claims, 5 Drawing Sheets

COUPLING STRUCTURE

CROSS REFERENCE TO RELATED APPLICATIONS

This non-provisional patent application claims priority under 35 U.S.C. §119(a) from Utility Model Application No. 201020530229.3 filed in The People's Republic of China on Sep. 14, 2010.

FIELD OF THE INVENTION

This invention relates to a coupling structure and in particular, to a coupling structure between an electric motor and a pump for liquids.

BACKGROUND OF THE INVENTION

For a liquid pump driven by an electric motor, a water tight seal is required between the motor and the pump to prevent water from leaking into the motor from the pump. The seal may be provided in conjunction with the coupling structure between the motor and the pump, where the shaft of the motor is also isolated from the liquid of the pump, as in the case where the liquid being pumped is caustic or otherwise likely to damage the shaft. A prior art pump, shown in FIGS. 6 & 7, is driven by an electric motor and includes an impeller 10, a carrier rod 31, a macerator 20 and a seal assembly. The seal assembly includes a rotating seal 32, a stationary seal 33, a rotating ring 34 and a stationary ring 35. In this design, an axial straight line knurl 43 is formed on the shaft 40. The carrier rod 31 is pressed onto the shaft 40 and held fast by the knurl so as to rotate with the shaft 40. The rotating seal 32 is press-fitted on the carrier rod 31 and is rotatable relative to the stationary seal 33 fixed to a bracket of the motor. The above construction can avoid rotational movement between the shaft 40 and the carrier rod 31. However, axial movement or separation between the shaft 40 and the carrier rod 31 may occur. Such movement of the carrier rod affects the alignment of the impeller and leads to failure of the pump. Furthermore, movement between the rotating seal 32 and the carrier rod 31 may occur, which may allow water to enter into the motor via the space between the rotating seal 32 and the carrier rod 31.

The present invention aims to provide a new coupling structure which can solve the problem of axial movement between the carrier rod and the motor shaft. In addition or alternatively, certain embodiments of the invention address the problem of movement between the rotating seal and the carrier rod.

SUMMARY OF THE INVENTION

Accordingly, in one aspect thereof, the present invention provides a coupling structure for connecting an impeller to a motor shaft of a liquid pump, comprising: a carrier rod sleeved on the shaft, wherein the carrier rod is fixed on the shaft via a screw thread structure.

Preferably, the arrangement of the screw thread structure and the running direction of the pump are such that operating the pump tends to reinforce the connection between the carrier rod and the shaft.

Preferably, the coupling structure further comprises a seal assembly comprising a rotating seal, a stationary seal, a rotating ring and a stationary ring, wherein the rotating seal is sealingly fixed on an outer surface of the carrier rod, the rotating ring is sealingly fixed to the rotating seal, the stationary seal is sealingly fixed to a bracket forming a part of a housing of the pump, the stationary ring is sealingly fixed to the stationary seal, and a spring urging the rotating ring into contact with the stationary ring whereby the rotating ring forms a rotatable water proof seal with the stationary ring, wherein the rotating seal is rotationally fixed to the carrier rod by an interlocking structure.

According to a second aspect thereof, the present invention provides a coupling structure for connecting an impeller to a motor shaft of a liquid pump, comprising: a carrier rod fixed on the shaft; and a seal assembly rotatably connecting the carrier rod to a housing of the pump, the seal assembly comprising a rotating seal, a stationary seal, a rotating ring and a stationary ring, wherein the rotating seal is sealingly fixed on an outer surface of the carrier rod, the rotating ring is sealingly fixed to the rotating seal, the stationary seal is sealingly fixed to a bracket forming a part of a housing of the pump, the stationary ring is sealingly fixed to the stationary seal, and a spring urging the rotating ring into contact with the stationary ring whereby the rotating ring forms a rotatable water proof seal with the stationary ring, wherein the rotating seal is rotationally fixed to the carrier rod by an interlocking structure.

Preferably, the coupling structure further comprises a macerator fixed to the carrier rod, disposed between the impeller and the seal assembly, and arranged to limit axial movement of the rotating seal along the carrier rod.

Preferably, the macerator is keyed to the carrier rod for rotation there with and interlocking structure connects the rotating seal to the macerator to prevent relative rotational movement between the rotating seal and the carrier rod.

Preferably, the interlocking structure includes notches formed on one of the rotating seal and the macerator and corresponding ribs formed on the other one of the rotating seal and the macerator.

Preferably, the ribs are surrounded by an outer tube.

Preferably, the interlocking structure includes fingers formed on one of the rotating seal and the macerator and disposed within corresponding recesses formed on the other one of the rotating seal and the macerator.

Preferably, the rotating ring is made of graphite and the stationary ring is made of ceramic.

In the embodiments of the present invention, axial separation between the shaft and the carrier rod can be avoided. Alternatively or in addition, movement between the rotating seal and the carrier rod can be avoided or limited.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
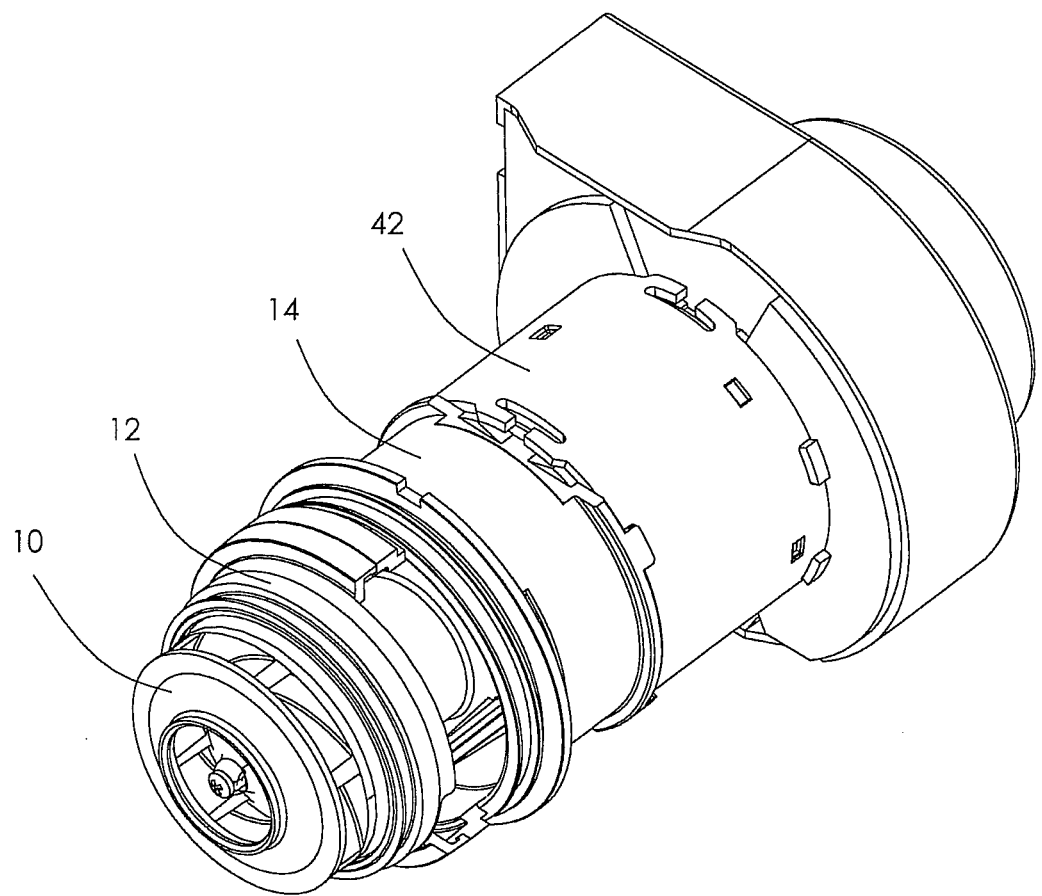
FIG. 1 illustrates a motor driven pump according to the present invention.

The pump of FIG. 1 has a pump section comprising an impeller 10 coupled to a shaft of an electric motor 42 by a coupling structure to be described herein after. The pump section is adapted to be fitted to a pump volute (not shown). The impeller is separated from the motor by a base plate 12 and a part of the pump housing such as bracket 14. The base plate 12 cooperatively forms a pumping chamber with the volute, in which chamber the impeller is disposed. The base plate and bracket form a further chamber, referred to as the secondary chamber, the purpose of which will be described herein after. The bracket also cooperates with a wall of the appliance to which it is fitted to separate the motor for the liquid being pumped.

Figure 2:
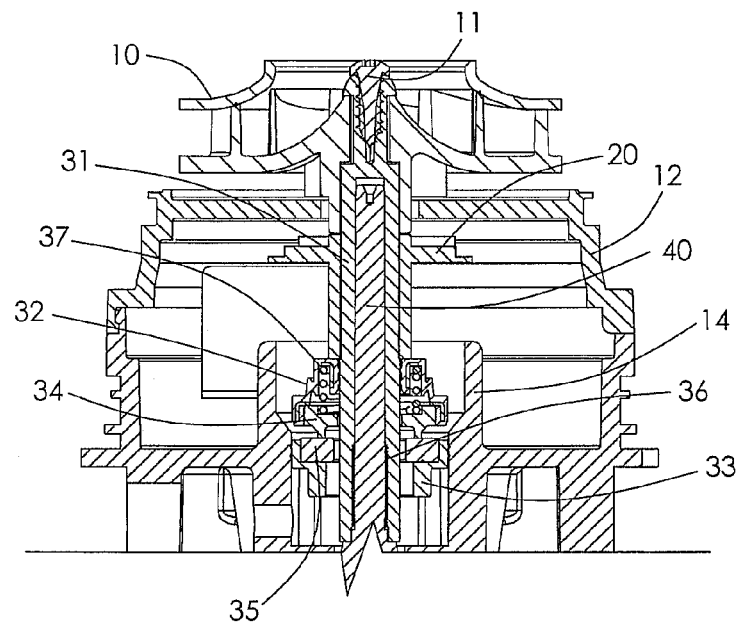
FIG. 2 is an assembled sectional view of working parts of the pump of FIG. 1, with a coupling structure in accordance with a preferred embodiment in the present invention.

FIG. 2 is a sectional view of the working parts of the pump showing a coupler connecting the shaft 40 of the electric motor to the impeller 10 of the pump, in accordance with a preferred embodiment in the present invention. The pump illustrated is designed for use in a dishwasher and the impeller is arranged to circulate a water and detergent mixture within the dishwasher for cleaning dishes etc. The pump also has a macerator disposed within the secondary chamber and fixed to the coupler so as to be driven by the motor. Foul water returning to the sump of the dishwasher after being circulated by the pump is passed through the secondary chamber allowing the blade 28 of the macerator to shred or macerate any large particles of, for example, food removed from the dishes etc., which were not caught by the sump filter. The pump may also be arranged to drain the dishwasher at the end of the washing cycle by pumping the liquid from the sump to the drain.

The coupler has a coupling structure comprising a carrier rod 31 sleeved on the shaft 40 and a seal assembly 30. A thread on the outer surface of the shaft 40 and a corresponding thread on the inner surface of the carrier rod 31 form a screw thread structure 36. The carrier rod 31 is fixed on the shaft 40 via the screw thread structure 36. Preferably, the direction of the screw thread and the motor operating direction is such that at start up, the load on the impeller tends to tighten the carrier rod to the shaft. The macerator 20 is press-fitted on the carrier rod between the seal assembly and the impeller and has a central hole having a complementary shape to the carrier rod to form a form lock press fit connection to limit relative rotational movement between the macerator and the carrier rod.

The seal assembly 30 provides a rotatable waterproof seal between the carrier rod and a housing part of the pump, such as the bracket 14, to prevent water ingress into the motor. The seal assembly comprises a rotating seal 32, a stationary seal 33, a rotating ring 34 and a stationary ring 35. The rotating seal 32 abuts the macerator 20 and is press-fitted on the carrier rod 31 to prevent water from leaking into the motor along the outer surface of the carrier rod 31. The stationary seal 33 is press-fitted into a hole or opening in the bracket 14 through which the carrier rod passes, to prevent water from leaking into the motor along the inner surface of the bracket 14. The stationary ring 35 is assembled to the stationary seal 33 and the rotating ring 34 is assembled to the rotating seal 32. A spring 37, disposed within the rotating seal resiliently urges the rotating ring 34 into a water proof sliding contact with the stationary ring 35 allowing the rotating seal to rotate with respect to the stationary seal while preventing liquid leakage through the seal assembly. The rotating seal and the stationary seal are preferably rubber products having at least one rigid, optionally metal, part giving the seal integrity or strength to be press fitted to the carrier rod or bracket and to hold the rings 34 and 35.

Preferably, the rotating ring 34 is made of graphite and the stationary ring 35 is made of ceramic. As the friction between graphite and ceramic is small, the force applied by the spring urging the rotating ring 34 into contact with the stationary ring 35 may be significant, thus keeping the two rings in direct contact under normal operating conditions and vibrations to prevent water leaking from between the two rings 34 and 35.

Figure 3:
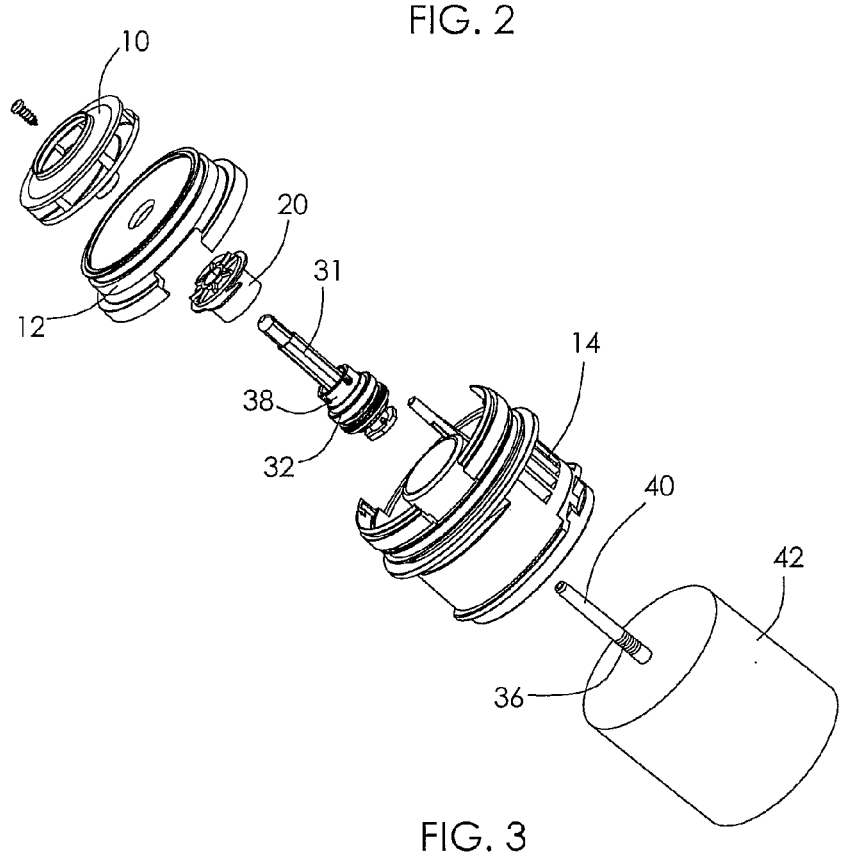
FIG. 3 is an exploded view of a pump in accordance with a second embodiment in the present invention.
Figure 3A:
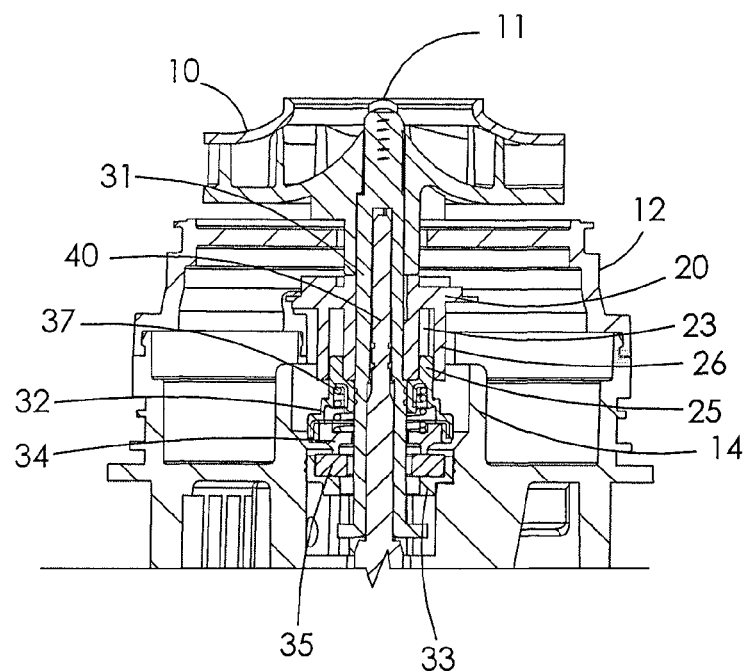
FIGS. 3A and 3B are assembled sectional views from two perpendicular directions of the pump shown in FIGS. 3-5.
Figure 3B:
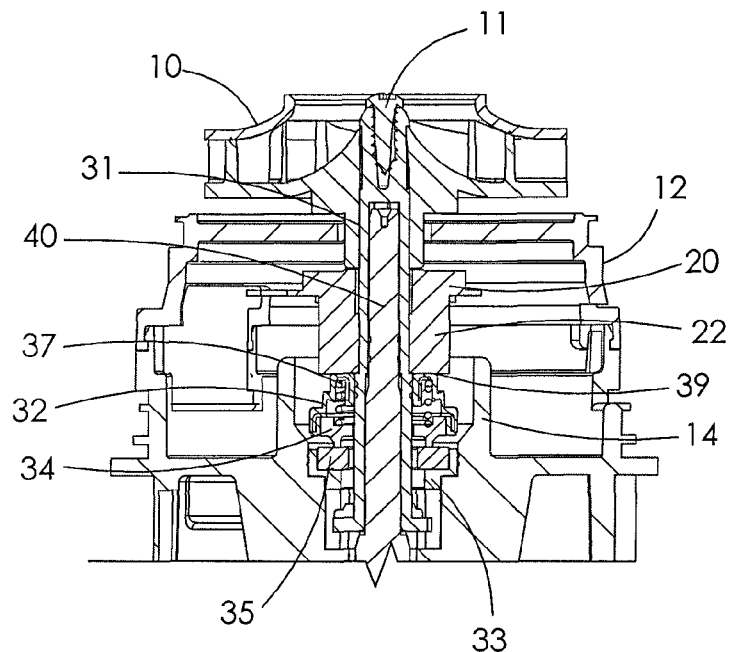
Figure 4:
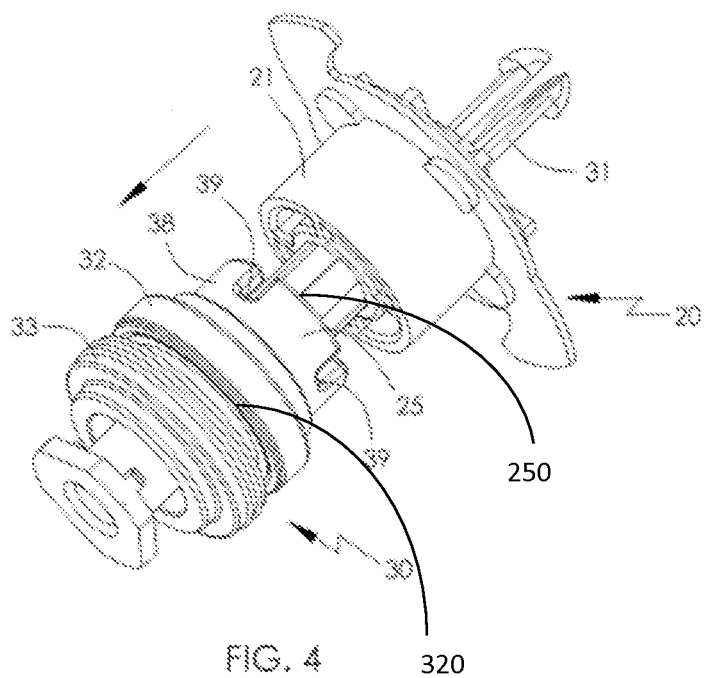
FIG. 4 is an partially exploded view of the coupling structure of the pump of FIG. 3.
Figure 5:
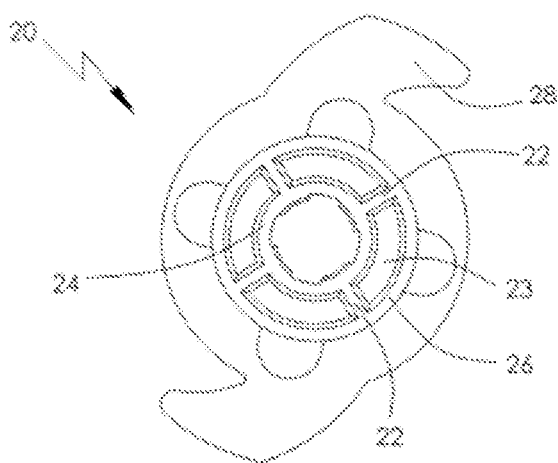
FIG. 5 is a view from below of a macerator of the pump of FIG. 3.
Figure 6:
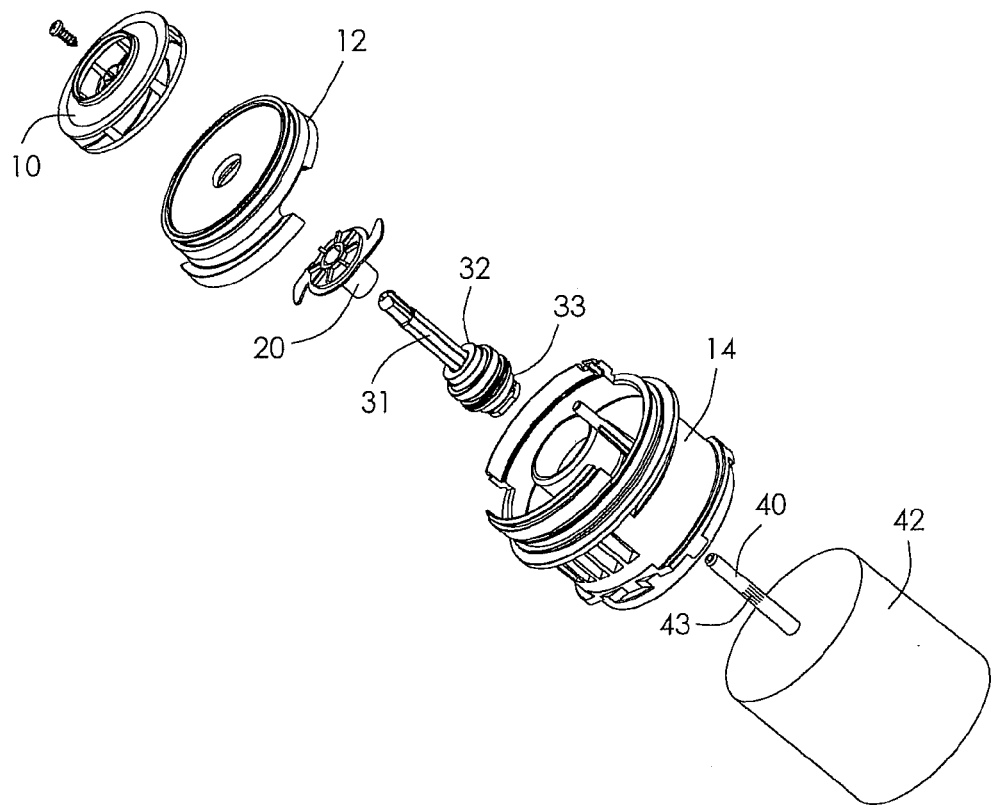
FIG. 6 is an exploded view of working parts of a prior art pump.
Figure 7:
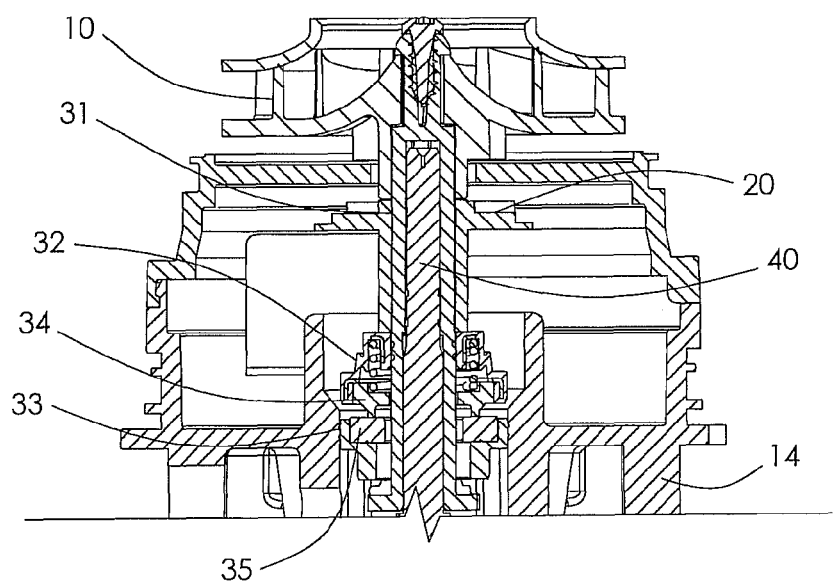
FIG. 7 is an assembled sectional view of the pump of FIG. 6.

FIG. 3 to 5 show a second embodiment of the present invention. The coupling structure further includes a middle member fixed on the carrier rod. The rotating seal is fixed to the middle member via an interlocking structure. In this embodiment, in addition to the screwed connection between the carrier rod and the motor shaft, the rotating seal 32 is rotationally interlocked with the carrier rod by way of the interlocking structure. In one embodiment, the middle member is the macerator 20. Thus the rotating seal is rotationally fixed on the carrier rod via the macerator 20 and axially fixed on the carrier rod by butting against a hub of the macerator which in turn buts against the impeller which is secured to the distal end of the carrier rod by an interlock and screw 11. The interlocking structure between the macerator and the rotating seal allows the macerator to be axially mated with the rotating seal as the macerator is pressed on to the carrier rod. The hub of the macerator as more clearly shown in FIG. 5, comprises an inner tube 24 and an outer tube 26 coaxial with the inner tube and interconnected by a number of ribs 22, thus forming a hub 21 with a number of axially extending recesses 23. The rotating seal 32 has an axially extending sleeve 38. Notches 39 form fingers 25 on the distal end of the sleeve 38 which extend into the recesses 23 of the hub 21 with notches 39 accommodating the ribs 22. Thus, during assembly, as the macerator 20 is pressed onto the carrier rod 31, in the direction of the arrow shown in FIG. 4, the fingers 25 enter the recesses 23 and the ribs 22 enter the notches 39 to interlock the rotating seal 32 with the macerator 20. Thus besides the friction between the rotating seal 32 and the carrier rod 31, the rotating seal 32 is also driven by the macerator 20 via the interlocking structure. In this manner, the rotating seal 32 is interlocked with the carrier rod 31 thereby avoiding relative rotational movement between the rotating seal 32 and the carrier rod 31. Furthermore, the outer tube 26 of the macerator 20 reduces disturbance to the water flow around the macerator 20, thereby avoiding the loss of motor efficiency due to the interlocking structure. In one embodiment, a lower surface 250 of each finger 25 is parallel to a top surface 320 of rotating seal 32. In one embodiment, the recess 23 is an annular segment, the finger 25 is an annular segment, there is no space formed between the recess 23 and the space after the finger 25 is disposed within the corresponding recess 23.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the recesses of the interlock structure may be formed on the rotating seal and the fingers may be formed on the hub of the macerator and the outer tube of the hub may be omitted with the interlock structure being formed by the ribs and notches formed on the macerator and rotating seal. Alternatively, the rotating seal may be directly interlocked with the carrier rod.

The invention claimed is:

1. A coupling structure for connecting an impeller to a motor shaft of a liquid pump, comprising:
 a carrier rod sleeved on the shaft,
 a middle member fixed on the carrier rod, and
 a rotating seal sleeved on the carrier rod and fixed to the middle member via an interlocking structure, the middle member being separately formed with the rotating seal and the carrier rod, the rotating seal being circumferentially interlocked with the carrier rod via the interlocking structure;
 wherein the middle member is a macerator fixed to the carrier rod, disposed between the impeller and the rotating seal, and arranged to limit axial movement of the rotating seal along the carrier rod;
 wherein the macerator is directly keyed to the carrier rod for rotation there with;
 wherein the interlocking structure includes notches formed on one of the rotating seal and the macerator and corresponding ribs formed on the other one of the rotating seal and the macerator;
 wherein the interlocking structure includes fingers formed on one of the rotating seal and the macerator and disposed within corresponding recesses formed on the other one of the rotating seal and the macerator;
 wherein the macerator comprises an inner tube and an outer tube, each rib is directly connected between the inner tube and the outer tube, each recess is formed by the inner tube, the two adjacent ribs and the outer tube.

2. The coupling structure of claim 1, wherein the carrier rod is fixed on the shaft via a screw thread structure and the arrangement of the screw thread structure and the running direction of the pump are such that operating the pump tends to reinforce the connection between the carrier rod and the shaft.

3. The coupling structure of claim 1, wherein the coupling structure further comprises a stationary seal, a rotating ring and a stationary ring, wherein the rotating seal is sealingly fixed on an outer surface of the carrier rod, the rotating ring is sealingly fixed to the rotating seal, the stationary seal is sealingly fixed to a bracket forming a part of a housing of the pump, the stationary ring is sealingly fixed to the stationary seal, and a spring urging the rotating ring into contact with the stationary ring whereby the rotating ring forms a rotatable water proof seal with the stationary ring.

4. The coupling structure of claim 3, wherein the rotating ring is made of graphite and the stationary ring is made of ceramic.

5. The coupling structure of claim 1, wherein the ribs are connected by the outer tube.

6. The coupling structure of claim 1, wherein the notches are formed between adjacent fingers and the recesses are formed between adjacent ribs.

7. The coupling structure of claim 1, wherein a lower surface of each finger is parallel to a top surface of the rotating seal.

8. The coupling structure of claim 1, wherein the recess is an annular segment, the finger is an annular segment, there is no space formed between the recess and the space after the finger is disposed within the corresponding recess.

9. A coupling structure for connecting an impeller to a motor shaft of a liquid pump, comprising:
 a carrier rod sleeved on the shaft,
 a middle member fixed on the carrier rod, and
 a rotating seal sleeved on the carrier rod and fixed to the middle member via an interlocking structure, the middle member being separately formed with the rotating seal and the carrier rod, the rotating seal being circumferentially interlocked with the carrier rod via the interlocking structure;
 wherein the middle member is a macerator fixed to the carrier rod, disposed between the impeller and the rotating seal, and arranged to limit axial movement of the rotating seal along the carrier rod;
 wherein the macerator is keyed to the carrier rod for rotation there with;
 wherein the interlocking structure includes notches formed on one of the rotating seal and the macerator and corresponding ribs formed on the other one of the rotating seal and the macerator;
 wherein the interlocking structure includes fingers formed on one of the rotating seal and the macerator and disposed within corresponding recesses formed on the other one of the rotating seal and the macerator;
 wherein the macerator comprises an inner tube and an outer tube, each rib is directly connected between the inner tube and the outer tube, each recess is formed by the inner tube, the two adjacent ribs and the outer tube.

10. The coupling structure of claim 9, wherein the recess is an annular segment, the finger is an annular segment, there is no space formed between the recess and the space after the finger is disposed within the corresponding recess.

* * * * *